United States Patent
Bernstein et al.

(10) Patent No.: US 6,438,300 B1
(45) Date of Patent: Aug. 20, 2002

(54) FIBER RETAINING SYSTEM

(75) Inventors: Steven Bernstein, Jackson; Maurice E. Kordahi, Atlantic Highlands, both of NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/399,752

(22) Filed: Sep. 21, 1999

(51) Int. Cl.[7] .................................................. G02B 6/44
(52) U.S. Cl. ...................... 385/100; 385/105; 385/110; 385/113; 385/114; 385/95
(58) Field of Search .............................. 385/95, 96, 97, 385/98, 99, 100, 105, 110, 113, 114, 135, 136, 137

(56) References Cited

U.S. PATENT DOCUMENTS

| | | |
|---|---|---|
| 4,507,008 A | 3/1985 | Adl et al. |
| 4,753,500 A | 6/1988 | Guazzo ..................... 350/96.2 |
| 5,598,500 A | 1/1997 | Crespel et al. .............. 385/139 |
| 5,642,451 A * | 6/1997 | Kennedy ..................... 385/99 |
| 5,790,741 A * | 8/1998 | Vincent et al. ............. 385/135 |
| 5,838,871 A | 11/1998 | Libert et al. |
| 5,857,045 A * | 1/1999 | Lee .............................. 385/70 |

FOREIGN PATENT DOCUMENTS

| | | |
|---|---|---|
| EP | 0368639 | 5/1990 |
| EP | 0493796 | 7/1992 |
| FR | 2693805 | 1/1994 |
| WO | 9815864 | 4/1998 |

* cited by examiner

*Primary Examiner*—Hung Xuan Dang
*Assistant Examiner*—Tuyen Tra

(57) ABSTRACT

An apparatus for retaining and protecting spliced optical fibers that are part of cables that have ultra-high strength steel wires, in which the optical fibers are free to move within a sleeve inside of the wires. The apparatus includes a joint box having opposing longitudinal cable termination ends. The high-strength steel wires of each cable are attached to a respective cable termination end. At least one optical fiber from each cable extends through its respective cable termination end and is spliced together to form a continuous optical fiber. The fiber or fibers are splinted and potted at locations longitudinally spaced from the splice to form ferrules. A central portion or shelf of the joint box includes fiber retaining devices which take the form of ferrule retainer assemblies. The ferrule retainer assemblies have a trough that contains and restrains a respective ferrule.

35 Claims, 6 Drawing Sheets

FIBER RETAINING SYSTEM

CROSS REFERENCE TO RELATED APPLICATIONS

This application is related to U.S. patent application Ser. No. 09/399,751 now U.S. Pat. No. 6,377,735 entitled "Fiber Retaining System", filed concurrently with the present application, and which is commonly owned and hereby incorporated by reference.

FIELD OF THE INVENTION

The present invention relates to the retention and protection of loose spliced optical fibers. More specifically, the invention relates to a housing for containing and protecting a fiber optic splice and a portion of the optical fibers on opposite sides leading to the splice.

BACKGROUND OF THE INVENTION

Communications networks are frequently made of many miles of optical fibers. Indeed, many of the networks can extend between continents and across oceans and other large bodies of water. For protection, the optical fibers are contained in a larger cable. An example of such a prior art cable is shown in FIG. 1. The cable 2 includes an outer insulating plastic coating 4, a copper sheath 6 inside the outer coating 4, and high strength members, such as steel wires 8, inside of the copper sheath 6. A loose tube 10 is contained within the steel wires 8, and one or more isolated optical fibers 12 are contained within the loose tube 10. This permits the fibers 12 to move with respect to the steel wires 8, the sheath 6 and the coating 4. This cable arrangement has been found to be desirable in many high strength applications.

As neither the cables nor the fibers can be made and deployed in infinite lengths, sections of the cables and the fibers are attached together. The fibers are typically attached to each other by a process known as splicing. For protection from the environment, these spliced sections are commonly contained in a watertight housing, which is frequently referred to as a joint box. Such housings or joint boxes are also used when it is necessary to make splices in the field. In circumstances when tension is applied to the cable, such as during the deployment of the cable underwater by a ship, it is undesirable to have the splice absorb the applied tension forces or to have the spliced portion leave the joint box and go back inside the cable.

In a prior joint box design, the end portions of which are disclosed in U.S. Pat. No. 4,507,008, the high strength steel wires are clamped to a first end of a joint box between a socket body and a plug and sleeve arrangement. The plug and sleeve are hollow along their central axis and the fibers extend unrestrained therethrough. A similar arrangement exists at the other end of the joint box. A center section or shelf of the joint box extends between the cable termination end sections. The fibers are provided with a great deal of slack, such as three feet of fibers, and the ends of the fibers are fused. The joined fibers, with their slack, are coiled onto the center section. The splice itself is fixed within the center section. The large amount of slack is intended to enable the fused optical fiber to be pulled or tensioned without placing stress on the splice and without the splice being pulled into one of the cables.

However, a large amount of excess slack may be undesirable from an assembly standpoint. Further, when the excess slack is bent to fit within the housing, the fibers could become damaged. Additionally, in this arrangement, affixing the splice directly within the housing can also be undesirable because if the slack is removed, the stresses and strains are applied at the splice. Accordingly, a solution that overcomes the drawbacks of the prior art was needed.

SUMMARY OF THE INVENTION

In view of the foregoing, it is a principal object of the present invention to provide an arrangement for restraining and protecting spliced optical fibers in a joint box.

It is another object of the present invention to provide a housing or joint box that eliminates the large amount of slack of optical fiber that needs to be used inside.

It is yet another object of the present invention to immobilize the optical fibers inside a joint box at a position spaced from the splice so that forces applied to the optical fibers are isolated from the spliced section.

It is another object of the present invention to prevent the optical fibers inside the joint box from moving in and out of their cables.

These and other objects are achieved in accordance with the present invention by an apparatus having first and second cables, each having a strengthening portion and an optical fiber positioned inside of the strengthening portion. In each cable, the optical fiber is longitudinally movable with respect to its respective strengthening portion and has a terminal end. The terminal ends of the optical fibers are spliced together at a splice location to form a continuous optical fiber. A housing includes opposed longitudinal end portions that are coupled to the strengthening portion of a respective cable. A fiber restraining device is spaced from the splice location and restrains the movement of the continuous optical fiber.

In another object, the present invention includes an apparatus having first and second cables, each having a strengthening portion and an optical fiber positioned inside of the strengthening portion. In each cable, the optical fiber is longitudinally movable with respect to its respective strengthening portion and has a terminal end. The terminal ends of the optical fibers are spliced together at a splice location to form a continuous optical fiber. A splint is positioned on the continuous optical fiber spaced from and separate from the splice and the splice location. A housing includes opposed longitudinal end portions and the strengthening portion of each cable is coupled to a respective end portion. The splint is contained within the housing between the longitudinal end portions.

In an alternative object, the present invention includes an apparatus having first and second cables, each having a strengthening portion and an optical fiber positioned inside of the strengthening portion. In each cable, each optical fiber is axially movable with respect to its respective strengthening portion and has a terminal end. The terminal ends of the optical fibers are spliced together at a splice location to form a continuous optical fiber. More than one optical fiber may be used. The continuous optical fiber has a portion potted within an enlarged support. The housing includes opposed longitudinal end portions. The housing is coupled to the strengthening portion of each cable. The enlarged support is spaced from the splice location and is contained between the longitudinal end portions of the housing.

In another object, the present invention includes an apparatus having first and second end portions, each having a cable attachment device. A fiber splicing region is disposed between the first and second end portions and can hold a spliced segment of a spliced fiber. First and second fiber holding devices are disposed between the fiber splicing region and a respective end portion.

The above and other objects, features and advantages of the present invention will be readily apparent and fully understood from the following detailed description of preferred embodiments, taken in connection with the appended drawings.

DETAILED DESCRIPTION OF THE PREFERRED EMBODIMENTS

Figure 1:
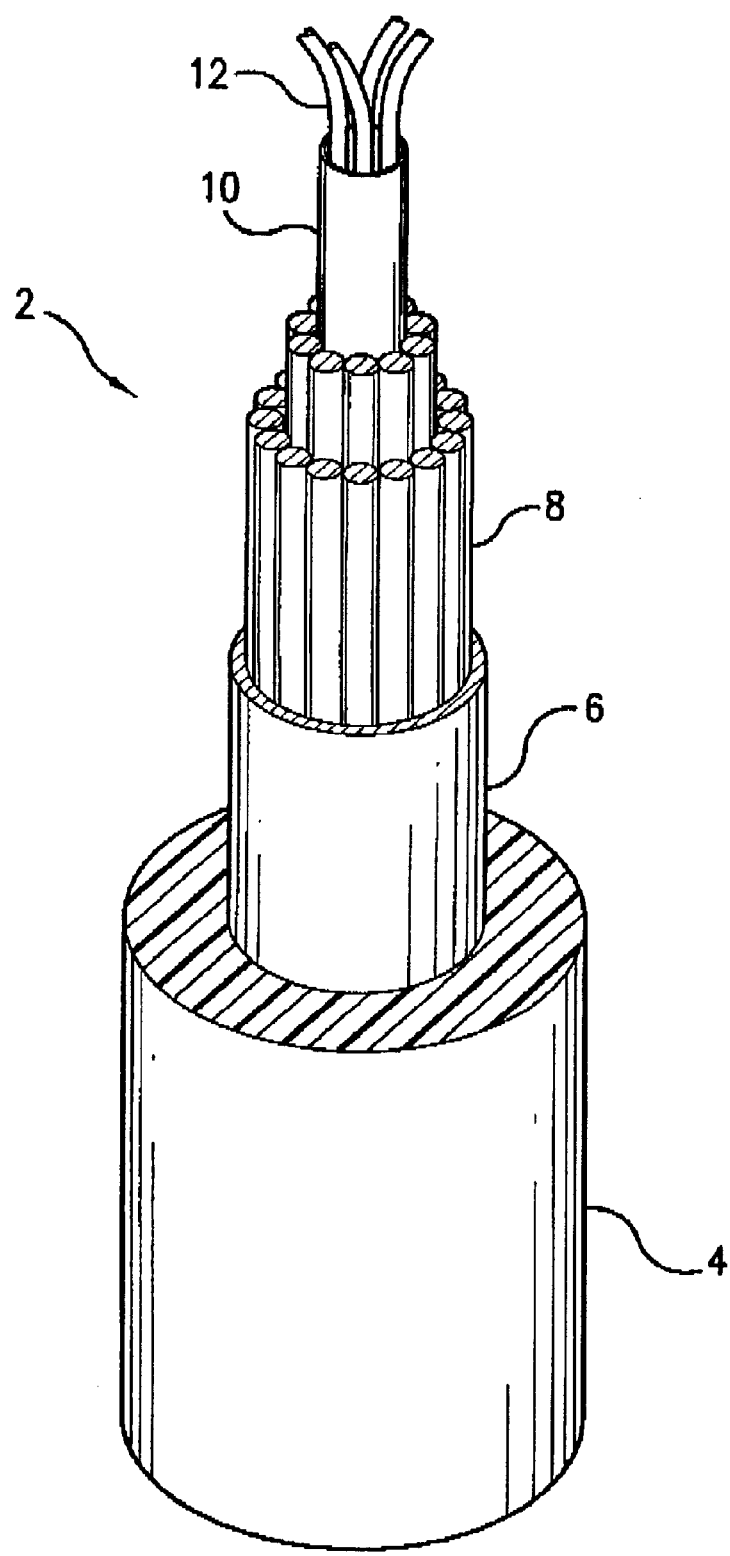
FIG. 1 is an isometric view of a prior art cable.
Figure 2:
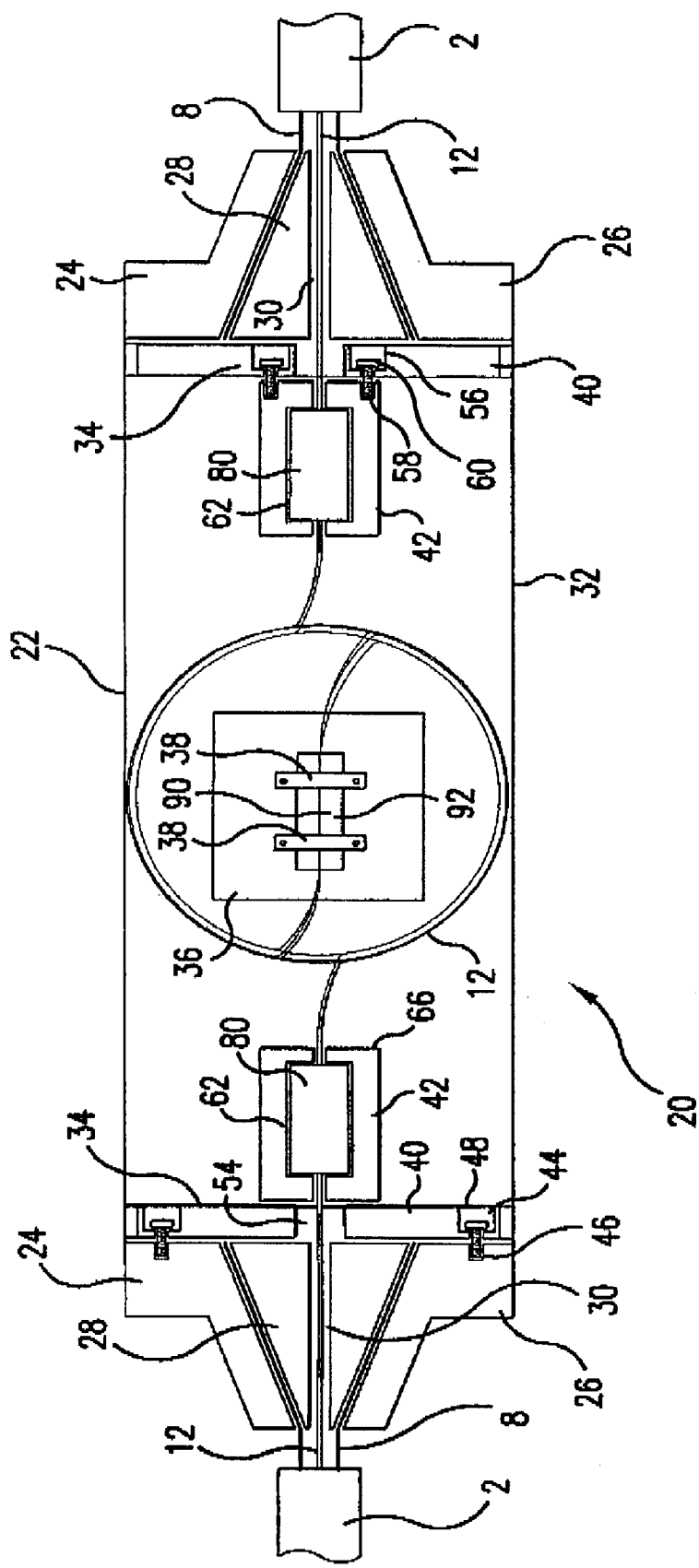
FIG. 2 is a schematic top view of the joint box and the cable of the present invention.
Figure 3:
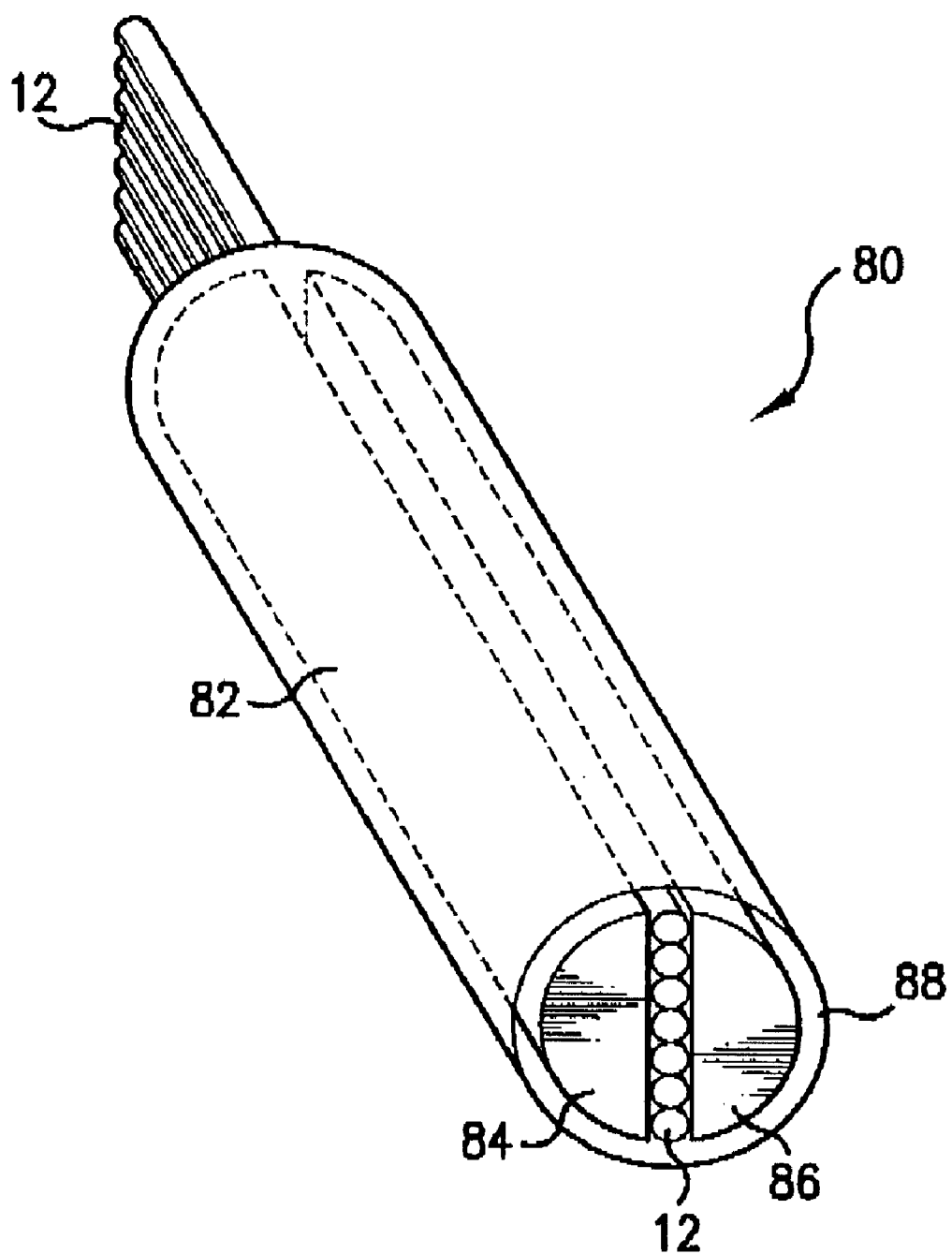
FIG. 3 is an isometric view of the potted fibers.

Details of the cable and fiber joining system for housing and protecting spliced optical fibers are shown in FIGS. 2–6. FIG. 2 schematically depicts the housing or joint box 20 connecting the free ends of two cables 2 together. The cables 2 are preferably of the type shown in FIG. 1 such that the optical fibers 12 can move longitudinally with respect to the remainder of the cable 2. The optical fibers 12 of the cables 2 are joined by a splice at splice location 90. As described below, the fibers 12 are restrained between the ends of the joint box 20 and the splice location 90. Preferably, the fibers 12 are restrained on both sides of the splice location 90 at a location longitudinally spaced from the splice location 90. This eliminates the need to provide a significant amount of slack for the optical fibers 12. Moreover, it isolates the splice and the splice reinforcing device 92 from forces that are created when tension is applied to the cable 2.

The joint box 20 includes cable termination sections 24 at its longitudinal ends, and a center section 22 disposed between, and connecting, the cable termination sections 24. Each cable termination section 24 includes a body 26 with a cone-shaped hollow cavity therein, and a cone-shaped plug and sleeve configuration 28 that fits within the hollow cavity. These elements function substantially as disclosed in U.S. Pat. No. 4,507,008, which is hereby incorporated by reference. In sum, the high strength steel wires 8 of the cables 2 are clamped between the hollow cavity of the body 26 and the plug and sleeve 28, and the outer surface of the sleeve is malleable which deforms around the high strength steel wire 8 as the plug is inserted. The body 26 and the plug and sleeve configuration 28 are hollow along their central axis 30. This enables the fibers 12 to extend unrestrained therethrough.

The shelf or center section 22 is disposed between the cable termination sections 24 and houses and protects the spliced section of the fibers 12. The center section 22 includes a pair of opposing ferrule retaining assemblies 34 and a central body 32 disposed between, and connected to, the ferrule retaining assemblies 34. Within this center section 22, the fibers 12 are spliced together at splice location 90. The splice 90 is typically protected by a splice reinforcing device 92 which may be mass fusion splint or another structure known for strengthening the splice region. The "spliced region" for spliced fibers is herein defined as the splice itself and a small distance on either longitudinal side of the splice that is used for strengthening the splice. The central body 32 further includes a shelf surface 36 upon which the splice reinforcing device 92 may rest. The shelf surface 36 may be any desirable size and shape, and may span the entire body 32 if desired. Further, one or more restraints 38, which may take any form, are preferably used to fix the splice reinforcing device 92 to the shelf surface 36. This prevents excess movement of the spliced region of the optical fibers 12.

Each ferrule retaining assembly 34 includes a shelf retainer 40 and a ferrule retainer 42. The shelf retainer 40 is attached on one side to a cable termination section 24 and to central body 32 on its other side. The shelf retainer 40 is generally disc-shaped and its diameter is slightly smaller than the sizes of the interfacing side of the cable termination section 24 and the longitudinal ends of central body 32. Each ferrule retaining assembly 34 is attached to its respective cable termination section 24 by any suitable arrangement such as by hardware. For example, shelf retainer 40 of the ferrule retaining assembly 34 may be provided with countersunk holes 44 and the body 26 of the cable termination section 24 may be provided with a threaded hole 46. A screw 48 may be used to extend through each countersunk hole 44 in the shelf retainer 40 and threadably engage with an aligned threaded hole 46 in the body 26 of the cable termination section 24. If desired, alternative attachment arrangements can be used. For clarity, FIG. 2 schematically illustrates these attachment elements only on the left side of the joint box 20. However, similar hardware is preferably used on the right side.

On its circumference, the shelf retainer 40 includes outwardly projecting alignment pins 50 and preferably at least two recessed holes 52. These features permit the locking of the/. shelf retainer 40 to the central body 32. The pins 50 enter slots, not shown, on the central body 32, and the two are rotated with respect to each other until alignment with locking members on the inside of the central body 32 is reached through the recessed holes 52 in the shelf retainer 40. These parts are then locked together with a screw or another device such as a spring biased locking pin. This locking arrangement has been used in other joint boxes and other devices and may be referred to as a "bayonette-type" locking arrangement. However, one of ordinary skill in the art will recognize that alternative attachment arrangements can be used in lieu of the "bayonette-type" locking arrangement.

The shelf retainer 40 further includes a slot 54 and a pair of laterally-spaced countersunk holes 56. The slot 54 permits the passage of the optical fibers 12 therethrough. The countersunk holes 56 are located on the side opposite from the other countersunk holes 44, and are used for attaching the shelf retainer 40 to the ferrule retainer 42. To facilitate this attachment, the ferrule retainer 42 includes corresponding threaded holes 58 therein. Conventional hardware, e.g., screws 60 and washers, may be used to extend through the aligned holes 56 and 58 and fix the shelf retainer 40 to the ferrule retainer 42. For clarity, FIG. 2 schematically illustrates these attachment elements only on the right side of the joint box 20. However, similar hardware is preferably used on the left side. Alternative attachment arrangements could be used. Further, the shelf retainer 40 and the ferrule retainer 42 could be integral with each other, e.g., machined from a single piece.

When attached to the shelf retainer 40, the ferrule retainer 42 is substantially horizontal and extends in a longitudinal direction. The ferrule retainer 42 includes a longitudinal trough 62, which preferably has a curved bottom surface 64, an inner side 66 closest to the splice, and a top cover 68. The trough 62 retains a ferrule 80, as described in more detail later herein, with the curved bottom surface 64 generally approximating the lower contour of the ferrule 80.

The trough 62 further includes an outer slot 74 at the end of the trough 62 distal from the splice location 90 and an inner slot 76 through the inner side 66 of the trough 62 on the side proximal to the splice location 90. Both slots 74 and 76 are sized to permit the optical fibers 12 to pass therethrough, but are narrower than the outer diameter of the ferrule 80 to prevent the passage of the ferrule 80 therethrough. The reduced sized slots 74 and 76 at the outer and inner ends of the trough 62 are formed by shoulders 70 and 72. The shoulders 70 and 72 may be machined into the main body of the ferrule retainer. In an alternative arrangement, an inner side cover with a slot could be attached to the inner side of the trough 62 though any desired arrangement, such as hardware. The inner shoulders 72 could then be created by the difference in sizes between the trough 62 and a slot in the inner side cover.

Figure 4:
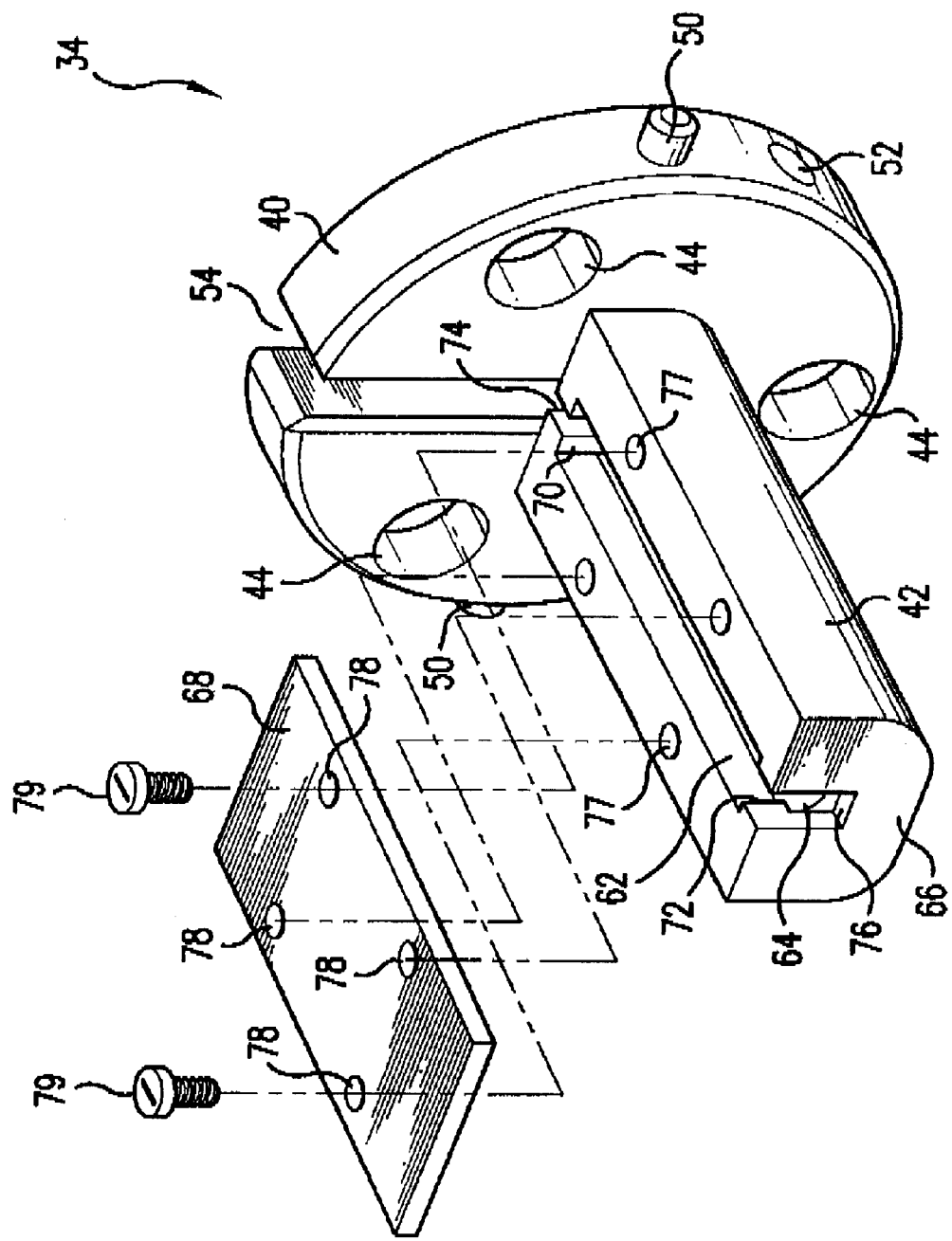
FIG. 4 is an isometric view of the ferrule retainer assembly with the top cover plate shown in an exploded format separated from the remainder of the assembly.
Figure 5:
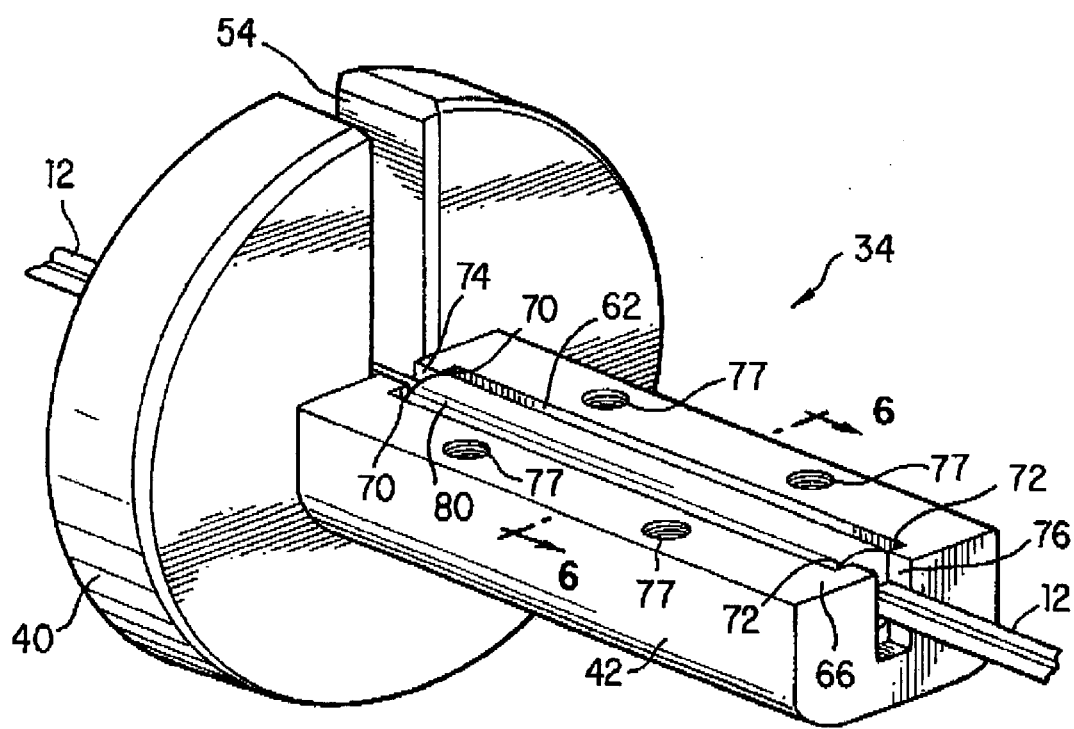
FIG. 5 is a perspective view depicting the splinted fibers inside the ferrule retainer assembly with the top cover removed.
Figure 6:
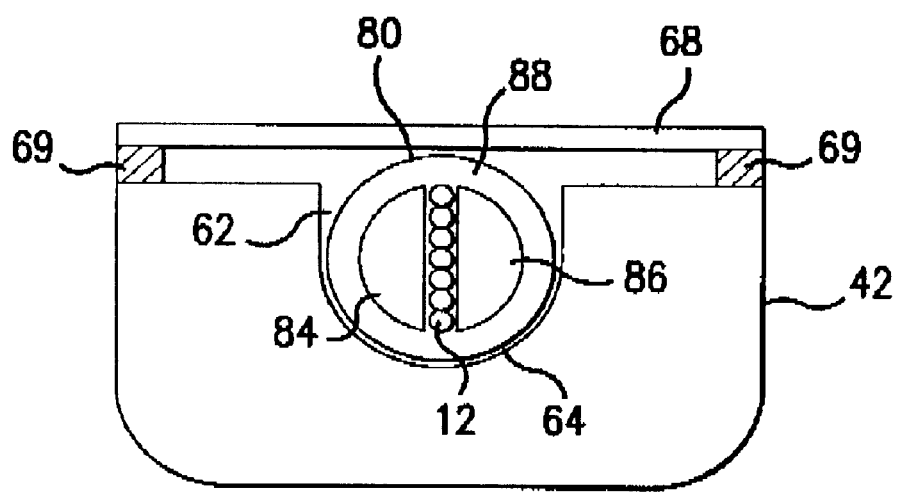
FIG. 6 is a cross section through line 6—6 of FIG. 5, shown with the top cover attached.

The top cover 68 preferably attaches to the main body of the ferrule retainer 42 by the use of threaded holes 77 in the top surface of the main body of the ferrule retainer. Holes 78 in the top cover 68 correspondingly align with the holes 77. Screws 79, some of which are shown in FIG. 4, may be used to fixedly attach the top cover 68 to the main body of the ferrule retainer, via the aligned holes 77 and 78. Alternative attachment arrangements could be used.

The enlarged fiber supporting elements or ferrules 80 are formed by aligning the optical fibers 12 and splinting them. Such a process has been done in the prior art to reinforce spliced fibers and such an arrangement may also be used in the present invention for the splice reinforcing device 92. The splint 82 consists of a pair of semicylindrical supports 84 and 86 on opposing sides of the aligned optical fibers 12. Preferably, but not necessarily, one support 84 is made from glass or quartz, while the other support 86 is made from a plastic material. A shrink tube 88 is preferably used to fix the semicylindrical supports 84 and 86 with respect to the aligned fibers 12 and provide a gripping force on the fibers therebetween. Adhesive is applied around the aligned fibers and between the semicylindrical supports 84 and 86.

Preferably, in the regions within and immediately adjacent to the ferrules 80, the loose optical fibers 12 are ribbonized. That is, they are organized and attached to each other in a line. This facilitates the formation of the ferrule 80. Optionally, the entire lengths of optical fibers 12 may be ribbonized between each ferrule 80 and the splice reinforcing device 92.

To make the assembled cable and fiber unit with the joint box 20, the ends of two cable sections are attached to the cable termination sections 24 as described above. Prior to or after that step, at least a portion of the fibers 12 are aligned and ribbonized. The ribbonized portion should at least approximately cover the area where the ferrule 80 will be formed. A ferrule 80 including a splint 82 is formed over that area as described above. The ferrule retainer assembly 34 is fully assembled except for the attachment of the top cover 68. The fibers 12 are oriented vertically and are placed within slot 54 of the shelf retainer 40. The shelf retainer 40 of the ferrule retainer assembly 34 is attached to the cable termination section 24. The ferrule 80 is placed inside of the trough 62 longitudinally between the shoulders 72 and 74. The fibers 12 are preferably ribbonized in this area and extend through the inner and outer slots 74 and 76 in alignment. The top cover 68 is attached to the remainder of the ferrule retainer assembly 34. Preferably the bottom of the top cover 68 includes a compressible gasket 69 to assist in applying a desired amount of compression on the ferrule 80. The cable termination sections 24 with the attached ferrule retainer assemblies 34 are attached the central body 32. The free ends of the optical fibers 12 are then spliced, either individually or as a mass fusion splice, and are reinforced, and attached to the shelf surface 36 in any desirable manner. Sufficient slack in the optical fibers 12 between the ferrule 80 and the splice reinforcing device 92 is provided to carry out the splicing operation. If desired, slack from the fibers 12 may be coiled onto the central body. Finally, a metal cover, not shown, is attached around the body 32, and a plastic sleeve, also not shown, may sealingly surround the entire joint box 20 in a conventional manner for waterproofing and insulating purposes.

Thus, as installed, the fibers 12 are aligned and ribbonized. The ribbonized fibers 12 are then "potted" by being embedded in a larger protective structure or body, the ferrule 80. This "potting" restrains the fibers 12 at a location adjacent the cable termination sections 24 and spaced from the point of fusion or splice and any reinforcing device used at the splice to isolate any forces applied to the fiber from the splice.

The ferrule 80 is sufficiently flexible in shear not to harm the coating on the fibers. Further, it is sufficiently rigid in compression to prevent the fibers from translating into or out of the ferrule 80, as the ferrule 80 is restrained in the trough 62. The amount of force applied to restrain the outer surface of the ferrule will be a function of the pressure applied from the top cover 68 and the force applied by the outer retaining shoulder 70 on the side that the tension force is applied.

Thus, when a pulling force on the optical fibers 12 is created, it is distributed over the entire splint 82. The fibers 12 are sufficiently gripped by the splint 82, and therefore, the fibers 12 are prevented from moving into the cable 2 and the force on the fibers 12 is transferred to joint box 20 via the ferrule retainer assembly 34 via the shoulders and the friction between the outside of the ferrule 80 and the trough 62 and top cover 68. Additionally, the region of the splice is isolated from these forces as they are transferred from the ferrule 80 directly to the joint box 20. As the effective transference of the tensile forces is a function of the length of contact between the fibers and the splint, the length of the splint can be designed based on expected parameters.

It is understood that while the invention depicts and describes a plurality of optical fibers 12 in the cable 2, the invention works similarly and is applicable for use with a cable having a single optical fiber. Further, depending on the length of the ferrule and amount of expected forces, it is also possible to create a ferrule and pot the fibers without the use of a splint, relying primarily on a protective encasement made from a glue. Additionally, in lieu of the potting or splint method described above, other methods of restraining the fibers prior to the splice may be used.

The present invention has been described in terms of preferred and exemplary embodiments thereof. Numerous other embodiments, modifications and variations within the scope and spirit of the appended claims will occur to persons of ordinary skill in the art from a review of this disclosure.

What is claimed is:

1. An apparatus comprising:
   first and second cables, each cable having a strengthening portion and an optical fiber positioned inside of the strengthening portion, each said optical fiber being longitudinally movable with respect to its respective strengthening portion, each said optical fiber having a terminal end, said terminal ends of the optical fibers being spliced together at a splice location to form a continuous optical fiber;

a housing, said housing including opposed first and second longitudinal end portions, each end portion of the housing being coupled to the strengthening portion of a respective cable, said housing further including a fiber restraining device, said fiber restraining device restraining movement of the continuous optical fiber and being spaced from the splice location; and an enlarged support attached to said optical fiber, said restraining device including a trough, said enlarged support including a splint and being restrained within said trough.

2. The apparatus of claim 1, wherein said fiber restraining device is a first fiber restraining device, said apparatus further comprising a second fiber restraining device, said second fiber restraining device being spaced from the splice location and restraining movement of the continuous optical fiber, said first fiber restraining device being located along the fiber between the splice location and the first end portion of the housing, and said second fiber restraining device being located along the fiber between the splice location and the second end portion of the housing.

3. The apparatus of claim 2, further comprising a splice reinforcing device positioned at the splice location, said splice reinforcing device being separate from, and between, said first and second fiber restraining devices.

4. The apparatus of claim 1, wherein said fiber restraining device is a first fiber restraining device and said enlarged support is a first enlarged support, said apparatus further comprising a second fiber restraining device and a second enlarged support, said second fiber restraining device including a trough, and said second enlarged support being restrained within said trough of the second fiber restraining device, said first fiber restraining device being located along the fiber between the splice location and the first end portion of the housing, and said second fiber restraining device being located along the fiber between the splice location and the second end portion of the housing.

5. The apparatus of claim 1, wherein each cable includes a plurality of optical fibers positioned inside of their respective strengthening portion, said optical fibers each being longitudinally movable with respect to its respective strengthening portion, each said optical fiber having a terminal ends, said terminal end of each optical fiber of the first cable being spliced together at a splice location with said terminal end of a respective optical fiber of the second cable to form a continuous optical fiber.

6. The apparatus of claim 5, wherein at least a portion of the optical fibers is ribbonized between the fiber restraining device and the splice location.

7. The apparatus of claim 5, wherein said first fiber restraining device is located along the fiber between the splice location and the first end portion of the housing, and wherein at least a portion of the optical fibers is ribbonized between the fiber restraining device and the first end portion.

8. An apparatus comprising:

first and second cables, each cable having a strengthening portion and an optical fiber positioned inside of the strengthening portion, each said optical fiber being longitudinally movable with respect to its respective strengthening portion, each said optical fiber having a terminal end, said terminal ends of the optical fibers being spliced together in a splice at a splice location to form a continuous optical fiber;

a first splint positioned on said continuous optical fiber spaced from and separate from said splice and said splice location;

a second splint, said second splint positioned on said continuous optical fiber spaced from and separate from said splice and said splice location;

a third splint, said third splint positioned on said continuous optical fiber at said splice and at said splice location, said third splint being disposed between said first and second splints;

first and second fiber restraining devices, said first and second fiber restraining devices restraining movement of the continuous optical fiber at the locations of the first and second splints, respectively; and a housing, said housing including opposed first and second longitudinal end portions, said housing being coupled to the strengthening portion of each cable, said splint contained within said housing between said first and second longitudinal end portions.

9. The apparatus of claim 8, wherein said first and second restraining devices each include a trough, said first and second splints being contained within the troughs of said first and second restraining devices, respectively.

10. The apparatus of claim 9, wherein said first and second fiber restraining devices are positioned adjacent to said first and second longitudinal end portions, respectively.

11. An apparatus comprising:

first and second cables, each cable having a strengthening portion and an optical fiber positioned inside of the strengthening portion, each said optical fiber being longitudinally movable with respect to its respective strengthening portion, each said optical fiber having a terminal end, said terminal ends of the optical fibers being spliced together at a splice location to form a continuous optical fiber;

said continuous optical fiber having a first portion potted within a first enlarged support and a second portion potted within a second enlarged support, said splice location being disposed between said first and second enlarged supports;

wherein each said enlarged support includes a splint;

wherein each cable includes a plurality of optical fibers positioned inside of their respective strengthening portion, said optical fibers each being longitudinally movable with respect to its respective strengthening portion, each said optical fiber having a terminal ends, said terminal end of each optical fiber of the first cable being spliced together at a splice location with said terminal end of a respective optical fiber of the second cable to form a continuous optical fiber, wherein the splint of each said enlarged end portion grips each said continuous optical fiber; and a housing, said housing including opposed first and second longitudinal end portions, said housing being coupled to the strengthening portion of each cable, said enlarged support being spaced from the splice location and being contained within said housing between said first and second longitudinal end portions.

12. The apparatus of claim 11, wherein said enlarged support is cylindrical shaped.

13. The apparatus of claim 12, further comprising a trough having a curved bottom surface, said trough containing and restraining said enlarged support.

14. An apparatus for attaching first and second cables and at least one optical fiber loosely contained therein, said apparatus comprising:

a first end portion, said first end portion having a cable attachment device;

a second end portion, on the opposite side from the first end portion, said second end portion also having a cable attachment device;

a fiber splicing region which holds a spliced segment of a spliced fiber, said fiber splicing region being disposed between said first and second end portions;

a first fiber holding device capable of restraining a first portion of the spliced fiber, said first fiber holding device disposed between said first end portion and said fiber splicing region;

a second fiber holding device capable of restraining a second portion of the spliced fiber, said second fiber holding device disposed between said second end portion and said fiber splicing region; and wherein each said first and second fiber holding devices includes a ferrule receiving portion.

15. The apparatus of claim 14, wherein said first fiber holding device is attached to said first end portion, and said second fiber holding device is attached to said second end portion.

16. The apparatus of claim 14, wherein said first and second end portions share a common central axis enabling the spliced fiber to extend therethrough, said first and second fiber holding devices being disposed along said axis.

17. The apparatus of claim 14, wherein each said ferrule receiving portion includes a trough extending in a direction parallel to said axis.

18. A method for attaching fibers within a housing comprising:

providing first and second cables, each cable having a strengthening portion and an optical fiber positioned inside of the strengthening portion, each optical fiber being longitudinally movable with respect to its respective strengthening portion, and each said optical fiber having a terminal end;

providing a housing including opposed first and second longitudinal end portions and a fiber restraining device;

coupling the strengthening portion of each respective cable to a respective end portion of the housing;

restraining movement of one optical fiber by the fiber restraining device at a location spaced from the terminal end of that fiber;

splicing the terminal ends of the optical fibers together at a splice location to form a continuous optical fiber;

forming an enlarged support on one optical fiber spaced from its terminal end; and placing said enlarged support within a trough.

19. The method of claim 18, wherein said fiber restraining device is a first fiber restraining device, further comprising the steps of:

providing a second fiber restraining device; and restraining movement of the other optical fiber by the fiber restraining device at a location spaced from the terminal end of that fiber.

20. An apparatus comprising:

first and second cables, each cable having a strengthening portion and an optical fiber positioned inside of said strengthening portion, each said optical fiber being longitudinally movable with respect to its respective strengthening portion, each said optical fiber having a terminal end, said terminal ends of said optical fibers being spliced together at a splice location to form a continuous optical fiber;

a housing including opposed first and second longitudinal end portions, each end portion of said housing being coupled to said strengthening portion of a respective cable, said housing further including a fiber restraining device spaced from said splice location, said fiber restraining device including a trough for restraining movement of the continuous optical fiber; and an enlarged support including a splint and attached to said optical fiber and restrained within said trough.

21. The apparatus of claim 20, wherein said fiber restraining device is a first fiber restraining device and said enlarged support is a first enlarged support, said apparatus further comprising a second fiber restraining device including a trough, and a second enlarged support being restrained within said trough of said second fiber restraining device, said first fiber restraining device being located along said fiber between said splice location and said first end portion of said housing, and said second fiber restraining device being located along said fiber between said splice location and said second end portion of said housing.

22. The apparatus of claim 20, wherein each cable includes a plurality of optical fibers positioned inside of their respective strengthening portion, said optical fibers each being longitudinally movable with respect to its respective strengthening portion, each said optical fiber having a terminal end, said terminal end of each optical fiber of said first cable being spliced together at a splice location with said terminal end of a respective optical fiber of said second cable to form a continuous optical fiber.

23. The apparatus of claim 22, wherein at least a portion of said optical fibers is ribbonized between said fiber restraining device and said splice location.

24. The apparatus of claim 22, wherein said first fiber restraining device is located along said fiber between said splice location and said first end portion of said housing, and wherein at least a portion of said optical fibers is ribbonized between said fiber restraining device and said first end portion.

25. An apparatus comprising:

first and second cables, each cable having a strengthening portion and an optical fiber positioned inside said strengthening portion, each said optical fiber being longitudinally movable with respect to its respective strengthening portion, each said optical fiber having a terminal end, said terminal ends of said optical fibers being spliced together in a splice at a splice location to form a continuous optical fiber;

a first splint positioned on said continuous optical fiber spaced and separate from said splice and said splice location;

a housing including opposed first and second longitudinal end portions, said housing being coupled to said strengthening portion of each cable, said splint contained within said housing between said first and second longitudinal end portions;

a second splint positioned on said continuous optical fiber spaced and separate from said splice and said splice location;

a third splint positioned on said continuous optical fiber at said splice and at said splice location, disposed between said first and second splints;

first and second fiber restraining devices each including a trough for restraining movement of said continuous optical fiber at said locations of said first and second splints, respectively; and said first and second splints being contained within said troughs.

26. The apparatus of claim 25, wherein said first and second fiber restraining devices are positioned adjacent said first and second longitudinal end portions, respectively.

27. An apparatus comprising:

first and second cables, each cable having a strengthening portion and an optical fiber positioned inside said strengthening portion, each said optical fiber being longitudinally movable with respect to its respective strengthening portion, each said optical fiber having a terminal end, said terminal ends of the optical fibers being spliced together at a splice location to form a continuous optical fiber;

said continuous optical fiber having a portion potted within a first enlarged support having a splint;

a housing including opposed first and second longitudinal end portions and coupled to said strengthening portion of each cable, said first enlarged support being spaced from said splice location and contained within said housing between said first and second longitudinal end portions; and said continuous optical fiber having a second portion potted within a second enlarged support having a splint, said splice location being disposed between said first and second enlarged supports.

28. The apparatus of claim 27, wherein each cable includes a plurality of optical fibers positioned inside of their respective strengthening portion, said optical fibers each being longitudinally movable with respect to its respective strengthening portion, each said optical fiber having a terminal end, said terminal end of each optical fiber of said first cable being spliced together at a splice location with said terminal end of a respective optical fiber of said second cable to form a continuous optical fiber, wherein said splint of each said enlarged end portion grips each said continuous optical fiber.

29. The apparatus of claim 27, wherein said enlarged supports are cylindrically shaped.

30. The apparatus of claim 29, further comprising first and second troughs, each having curved bottom surfaces and containing and restraining said first and second enlarged supports, respectively.

31. An apparatus for attaching first and second cables and at least one optical fiber loosely contained therein, said apparatus comprising:

a first end portion, having a cable attachment device;

a second end portion spaced away from said first end portion, and having a cable attachment device;

a fiber splicing region which holds a spliced segment of a spliced fiber, said fiber splicing region being disposed between said first and second end portions;

a first fiber holding device capable of restraining a first portion of said spliced fiber, said first fiber holding device disposed between said first end portion and said fiber splicing region;

a second fiber holding device capable of restraining a second portion of said spliced fiber, said second fiber holding device disposed between said second end portion and said fiber splicing region; and wherein each of said first and second fiber holding devices includes a ferrule receiving portion, said ferrule receiving portion including a trough extending in a direction parallel to said axis.

32. A method for attaching fibers within a housing comprising:

providing first and second cables, each cable having a strengthening portion and an optical fiber positioned inside said strengthening portion, each optical fiber being longitudinally movable with respect to its respective strengthening portion, and each said optical fiber having a terminal end;

providing a housing including opposed first and second longitudinal end portions and a fiber restraining device;

coupling said strengthening portion of each respective cable to a respective end portion of said housing;

restraining movement of one optical fiber by said fiber restraining device at a location spaced from said terminal end of that fiber;

splicing said terminal ends of said optical fibers together at a splice location to form a continuous optical fiber;

forming an enlarged support on one optical fiber spaced from its terminal end; and placing said enlarged support within a trough.

33. The method of claim 32, wherein said fiber restraining device is a first fiber restraining device, further comprising:

providing a second fiber restraining device; and restraining movement of said other optical fiber by said second fiber restraining device at a location spaced from said terminal end of that fiber.

34. A fiber retaining apparatus for restraining optical fiber from a fiber optic wherein said cable is entering or exiting a housing, comprising:

a fiber restraining device coupled to a first portion of the housing;

a trough included within said fiber restraining device; an enlarged support attached to the optical fiber and restrained within said trough; and said trough further comprising an outer slot and an inner slot distal from said outer slot, said outer and inner slots sized to permit the optical fiber to pass therethrough.

35. The fiber restraining apparatus of claim 34, wherein said trough further includes a center portion sized to receive said enlarged support, whereby said enlarged support is restrained from moving because the center portion is larger than the outer and inner slots.

* * * * *